US011339829B2

(12) United States Patent
Jupe et al.

(10) Patent No.: US 11,339,829 B2
(45) Date of Patent: May 24, 2022

(54) SLIDING ELEMENT COMPRISING A PIGMENT

(71) Applicants: Mahle International GmbH, Stuttgart (DE); Mahle Engine Systems UK Ltd, Rugby (GB)

(72) Inventors: Kevin Jupe, Rugby (GB); Kayleigh McEwan, Coalville (GB)

(73) Assignees: MAHLE INTERNATIONAL GMBH; MAHLE ENGINE SYSTEMS UK LTD

( * ) Notice: Subject to any disclaimer, the term of this patent is extended or adjusted under 35 U.S.C. 154(b) by 0 days.

(21) Appl. No.: 16/973,032

(22) PCT Filed: Jun. 4, 2019

(86) PCT No.: PCT/EP2019/064535
§ 371 (c)(1),
(2) Date: Dec. 7, 2020

(87) PCT Pub. No.: WO2019/234049
PCT Pub. Date: Dec. 12, 2019

(65) Prior Publication Data
US 2021/0270318 A1    Sep. 2, 2021

(30) Foreign Application Priority Data
Jun. 8, 2018 (GB) .................................... 1809477

(51) Int. Cl.
*F16C 9/02* (2006.01)
*F16C 9/04* (2006.01)
(Continued)

(52) U.S. Cl.
CPC ............ *F16C 33/201* (2013.01); *C09D 5/082* (2013.01); *F16C 9/02* (2013.01); *F16C 9/04* (2013.01);
(Continued)

(58) Field of Classification Search
CPC .. F16C 9/02; F16C 9/04; F16C 17/022; F16C 33/046; F16C 33/201; F16C 33/206;
(Continued)

(56) References Cited

U.S. PATENT DOCUMENTS 5,700,093 A    12/1997 Hiramatsu et al.
7,887,922 B2    2/2011 Mayston et al.
(Continued)

FOREIGN PATENT DOCUMENTS

CN    1756805 A  *  4/2006    ......... C09B 67/0013
CN    1997833 A     7/2007
(Continued)

OTHER PUBLICATIONS

European Coatings Handbook, pp. 131-135.
(Continued)

*Primary Examiner* — James Pilkington
(74) *Attorney, Agent, or Firm* — Fishman Stewart PLLC

(57) ABSTRACT

A sliding element for an engine may include a polymer-based overlay layer and a metallic substrate. The polymer-based overlay layer may include a polymer-based matrix, a metal particulate, and a pigment. The pigment may have a hardness of at least 4 on the Mohs hardness scale.

20 Claims, 1 Drawing Sheet

(51) Int. Cl.
*F16C 17/02* (2006.01)
*F16C 33/04* (2006.01)
*F16C 33/20* (2006.01)
*F16C 41/00* (2006.01)
*C09D 5/08* (2006.01)

(52) U.S. Cl.
CPC .......... *F16C 17/022* (2013.01); *F16C 33/046* (2013.01); *F16C 33/206* (2013.01); *F16C 41/008* (2013.01); *F16C 2202/04* (2013.01); *F16C 2206/40* (2013.01); *F16C 2208/32* (2013.01); *F16C 2240/48* (2013.01); *F16C 2240/60* (2013.01); *F16C 2360/22* (2013.01)

(58) Field of Classification Search
CPC .......... F16C 41/008; F16C 2202/04; F16C 2206/40; F16C 2240/60; F16C 2208/32; F16C 2202/50; F16C 2240/48; F16C 2360/00; C09D 5/082
USPC ....... 384/261, 276, 282, 295, 297, 907–908, 384/910, 913
See application file for complete search history.

(56) References Cited

U.S. PATENT DOCUMENTS

| | | | |
|---|---|---|---|
| 10,184,521 B2 | 1/2019 | Leonardelli | |
| 10,190,631 B2 * | 1/2019 | Gorges | G01K 11/12 |
| 2007/0057364 A1 * | 3/2007 | Wang | H01L 33/642 |
| | | | 257/701 |
| 2013/0330572 A1 | 12/2013 | Staschko et al. | |
| 2014/0271440 A1 * | 9/2014 | Constantz | E04D 13/1618 |
| | | | 423/430 |
| 2015/0194240 A1 * | 7/2015 | Ranganathan | H01B 7/292 |
| | | | 174/126.2 |
| 2017/0022369 A1 * | 1/2017 | von Schleinitz | C08G 18/76 |
| 2017/0138396 A1 | 5/2017 | Latham et al. | |
| 2017/0350448 A1 | 12/2017 | Leonardelli | |

FOREIGN PATENT DOCUMENTS

| | | | | |
|---|---|---|---|---|
| CN | 103080381 A | | 5/2013 | |
| CN | 103881367 A | * | 6/2014 | ............ C08G 69/26 |
| CN | 205917333 U | | 2/2017 | |
| CN | 107001630 A | | 8/2017 | |
| DE | 102010018328 A1 | | 10/2011 | |
| DE | 102013202123 B3 | | 5/2014 | |
| EP | 2532905 A1 | | 12/2012 | |
| EP | 3284965 A1 | | 2/2018 | |
| GB | 2517437 A | * | 2/2015 | ............ F16C 41/008 |
| JP | 2002100022 A | * | 4/2002 | |
| JP | 5251186 B2 | * | 7/2013 | |
| JP | 2015007195 A | * | 1/2015 | |
| JP | 2015120936 A | * | 7/2015 | |
| JP | 2016530194 A | * | 9/2016 | |
| WO | WO-2004/113749 A1 | | 12/2004 | |
| WO | WO-2015/024898 A2 | | 2/2015 | |
| WO | WO-2015024898 A2 | * | 2/2015 | ............ B32B 27/20 |
| WO | WO-2015135745 A1 | * | 9/2015 | ............ C09D 175/04 |
| WO | WO-2016006374 A1 | * | 1/2016 | ............ B05D 3/00 |

OTHER PUBLICATIONS

English abstract for DE-2532905.
English abstract for DE-102013202123.
English abstract for DE-102010018328.
Chinese Search Report dated Dec. 13, 2021 for copending Chinese App. No. 201980037846 (with English translation).
Chinese Office Action dated Dec. 22, 2021 for copending Chinese App. No. 201980037846 (with English translation).

* cited by examiner

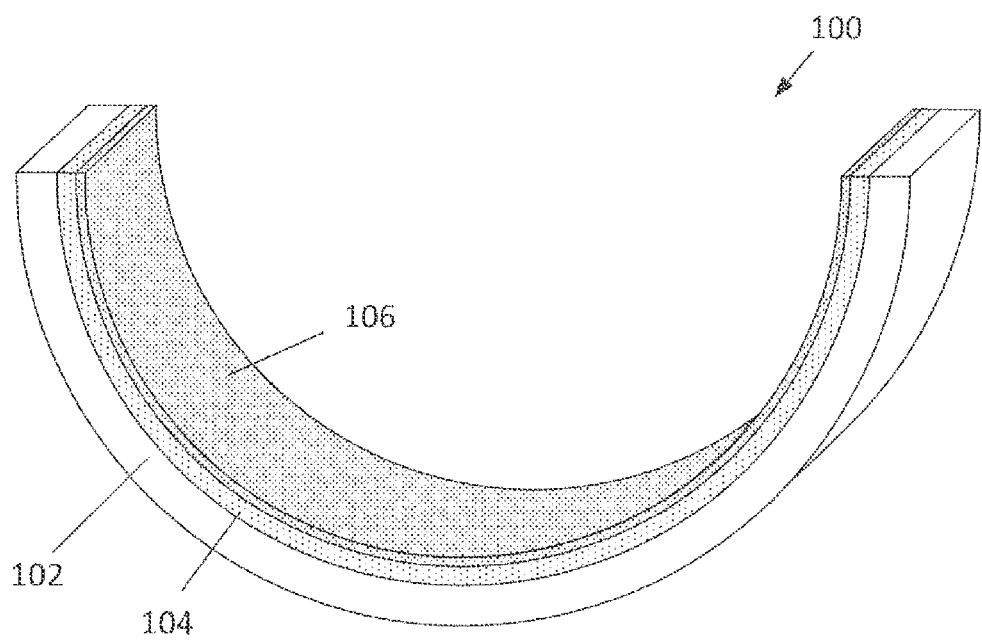

SLIDING ELEMENT COMPRISING A PIGMENT

CROSS-REFERENCE TO RELATED APPLICATIONS

This application claims priority to International Patent Application No. PCT/EP2019/064535, filed on Jun. 4, 2019, and Great Britain Patent Application No. GB 1809477.1, filed on Jun. 8, 2018, the contents of both of which are hereby incorporated by reference in their entirety.

TECHNICAL FIELD

The present invention relates to sliding engine components having a polymer-based overlay layer, in particular to sliding engine components having a polymer-based bearing overlay layer which comprises a pigment.

Such sliding engine components may include bearing lining shells, bushes, bearing surfaces of crankshafts, bearing surfaces of camshafts, bearing surfaces of connecting rods, thrust washers, bearing surfaces of a bearing block, bearing surfaces of a bearing cap, and piston assembly components such as piston rings, piston skirts, and cylinder walls and cylinder liners.

BACKGROUND

In internal combustion engines, the bearing assemblies typically each comprise a pair of half bearings retaining a crankshaft that is rotatable about an axis. Each half bearing is a hollow generally semi-cylindrical bearing shell. The bearing assembly may comprise a flanged half bearing, in which the bearing shell is provided with a generally semi-annular thrust washer extending outwardly (radially) at each axial end. In other bearing assemblies it is also known to use an annular or circular thrust washer.

The bearing surfaces of sliding bearings generally have a layered construction, in which a strong backing material is coated with one or more layers having preferred tribological properties, which define the bearing surface that faces the cooperating moving part, in use. In known half bearings and thrust washers: the strong backing material may be steel, having a thickness of about 1 mm or more; the bearing surface is coated with a layer (the "overlay" or "overlay layer") of 6 µm to 25 µm of a plastic polymer-based composite layer; and optionally at least one intervening layer (a "lining layer" or "intermediate layer") may be provided between the backing and the overlay layer, such as an aluminium-based material (e.g. aluminium-tin alloy) or a copper-based material (e.g. copper-tin bronze), adhered to the backing, and the thickness of the optional lining layer is generally in the range from about 0.1 mm to 0.5 mm (e.g. 300 µm of aluminium-tin alloy).

It is known in the field to use composite plastic polymer-based overlay layers on a steel backing, in which the overlay comprises a matrix of a polymer material, having distributed throughout the matrix mechanical performance enhancing additives, such as metal particulate, silane compounds, and dry lubricant particulate. The metal particulate may be, for example, a silvery-coloured metal powder (e.g. aluminium), or a copper-coloured metal powder (e.g. copper). The metal particulate may impart conformability and improve heat distribution throughout the overlay layer. The metal particulate may also improve the fatigue strength of the overlay layer.

It is also known to add coloured pigment to the polymer-based matrix in order to colour the polymer-based overlay layer. The colour of the pigment may be chosen to provide the polymer-based overlay layer with a colour that is different to a colour of the underlying substrate. This allows the presence of the polymer-based overlay layer to be readily determined simply by looking at the bearing surface and observing the colour.

For example, WO 2015/024898 A2 describes a plastic polymer-based composite material for use as an overlay layer on a steel backing, in which the overlay comprises a matrix of a polyamide/imide-based polymer, having distributed throughout the matrix: from 10 to 15 vol % copper phthalocyanine pigment; from 1 to less than 15 vol % of a metal particulate (e.g. metal powder and/or metal flakes); from 1 to 15 vol % of a fluoropolymer, the balance being polyamide/imide resin apart from incidental impurities; and 3 to 6 vol % of silane compound. For example, the polymer-based overlay may comprise 12.5 vol % Al, 5.7 vol % PTFE particulate, 4.8 vol % silane, <0.1 vol % other components, and the balance may be polyamide/imide, apart from incidental impurities.

However, while the coloured pigment imparts a chosen colour to the polymer-based matrix, the pigment does not enhance any of the mechanical properties of the polymer-based overlay layer. In other words, the use of a coloured pigment introduces a degree of non-functionality to the polymer-based matrix. Further, it has been found that the addition of coloured pigment of the prior art in the levels required to provide a polymer-based overlay layer with a colour can compromise the structural integrity, the wear resistance, the fatigue properties, and the seizure resistance of the polymer-based matrix. It may also adversely affect the hardness and/or strength of the polymer-based matrix. Conversely, the use of coloured pigment in low levels does not alter the colour of the polymer-based matrix sufficiently for it to be distinguished from the underlying substrate. The range of colours and colour intensities is therefore limited when adding coloured pigments to colour polymer-based overlays.

It has further been noted that where the polymer-based overlay comprises metal particulate, such as aluminium flakes, the metal particulate itself may influence the colour of the polymer-based overlay. For example, it has been found that where the polymer-based overlay comprises aluminium flakes and no specific pigment has been added, the polymer-based overlay appears grey or silver in colour because of the flakes. This may be, at least in part, due to the reflective nature of the aluminium flakes. Furthermore, it has been found that, because of the reflective nature of the aluminium flakes, a greater quantity of pigment is required to colour a polymer-based overlay comprising aluminium flakes compared to the quantity of pigment required to colour an equivalent overlay layer without any aluminium flakes. However, as set out above, the presence of a high quantity of existing pigment is undesirable since it introduces a high degree or quantity of non-functionality to the polymer-based matrix, and may even compromise some of the mechanical properties of the polymer-based overlay.

Accordingly, there is therefore a need to provide a means for controlling the colour of a polymer-based overlay, and in particular a polymer-based overlay comprising metal particulate, without compromising the mechanical properties of the overlay and potentially while also enhancing the mechanical properties of the overlay.

SUMMARY

According to a first aspect of the present invention, there is provided a sliding element for an engine, the sliding element comprising a polymer-based overlay layer and a metallic substrate, the polymer-based overlay layer comprising: a polymer-based matrix; a metal particulate; and a pigment; wherein the pigment has a hardness of at least 4 on the Mohs hardness scale.

It has been found that the provision of a pigment having a hardness of at least 4 on the Mohs hardness scale advantageously improves the wear resistance of the polymer-based overlay layer compared to using pigment having a lower hardness, such as copper phthalocyanine discussed above. This allows the pigment to be added in a sufficient quantity to overcome the reflective properties of the metal particulate, and therefore impart a colour to the polymer-based overlay layer while also improving the mechanical properties of the polymer-based overlay layer. Additionally, this means that sufficient pigment can be added to impart a colour to the polymer-based overlay layer without the pigment adversely affecting the mechanical properties of the polymer-based overlay layer. The provision of a pigment having a hardness of at least 4 on the Mohs hardness scale may advantageously improve the wear resistance of the polymer-based overlay layer by abrading the surface of the cooperating component, such as a journal, to lower its roughness. Additionally, the particles of pigment themselves may resist wear which improves the overall wear properties of the polymer-based overlay layer.

As used herein with reference to the invention, the term "pigment" refers to a solid material which selectively absorbs and reflects light over certain wavelengths so as to appear a certain colour. Pigments are typically ground into a particulate to enable them to be added to a liquid vehicle in suspension so as to impart a colour to the liquid vehicle. In this manner, pigments may be used to form paints and inks. Suitable pigments may have appropriate temperature and chemical resistance for the environment in which the sliding engine element is to be used.

The pigment may comprise solid particulate. The pigment may be dispersed throughout the polymer-based matrix.

As used herein with reference to the invention, the term "imparts a colour" or "imparting a colour" means that a colour of the polymer-based overlay layer is substantially determined by the addition of a pigment.

The skilled person will understand that the polymer-based overlay layer may not necessarily be in direct contact with the surface of the metallic substrate since, as discussed below, the sliding engine element may further comprise an intermediate layer or layers between the metallic substrate and the polymer-based overlay layer.

The addition of the pigment may avoid the need to apply other identifying features to the surface of the component by, for example, a stamping process or through an additional printing or etching process, which would require additional manufacturing steps and may interfere with the operation of the component. For example, in the case of a bearing shell, an identification mark stamped into the outer surface risks embossing the inner surface, which is configured to cooperate with a rotating journal with very small tolerances. Similarly, printing, etching, or stamping an identification mark onto the outside of a bearing shell may affect the way in which the bearing shell sits within its housing, in use, thereby affecting performance.

The pigment may be distributed substantially evenly throughout the polymer-based matrix of the polymer-based overlay layer. This may advantageously provide an even colour through the entire polymer-based overlay layer. Alternatively, the pigment may vary in concentration across the thickness of the layer. This may cause a colour change as the polymer-based overlay layer is worn, advantageously allowing wear of the polymer-based overlay layer to be identified. For example, the concentration of pigment may be greatest at the surface of the polymer-based overlay layer furthest from the metallic substrate.

The metallic substrate is preferably formed from a metal having sufficient strength to give the bearing element greater structural rigidity in use. Suitable metallic substrate materials include: steel, aluminium, bronze, brass, bismuth, copper, nickel, tin, zinc, silver, gold and iron, or alloys of such materials. The substrate may comprise a combination of two or more such materials or alloys. Particularly suitable substrate materials for bearing elements embodying the present invention include steel, iron, aluminium, copper alloy, bronze, and brass alloys.

The sliding engine element may further include an intermediate layer or bearing lining layer which may provide an improved surface for adhesion of the polymer-based overlay layer when certain metallic substrate materials are used. Suitable materials for the optional intermediate layer include aluminium, tin, nickel, silver, copper and/or iron or alloys comprising one or more of such materials. The optional intermediate layer may comprise a combination of two or more such materials/alloys. The intermediate layer may also include an adhesion promoter and/or be subjected to a pre-treatment, for example a phosphating, chromating or silicating treatment.

The polymer-based matrix comprises a polymeric material. Examples of suitable polymeric materials include or may comprise: cross-linkable bonding agents; thermosetting plastics; high melting point thermoplastics; materials having a matrix of at least one high melting point thermoplastic material; fibre-reinforced plastics; any combination of these materials. Other suitable materials are envisaged and will be readily apparent to the skilled person. Particularly suitable polymeric materials include: PAI (polyamide imide); PI (polyimide); epoxy; epoxy resin; acrylate resin; polyurethane, fluoropolymer, polyetheretherketone, formaldehyde resin, PBI (Polybenzimideazole); phenolic resin; silicone resin; or a combination of any of these materials. These materials are characterised by high temperature resistance and excellent media resistance (such as chemical resistance to lubricants). One particularly preferred polymeric material for bearing elements embodying the present invention is polyamide imide (PAI).

The polymer-based overlay layer may comprise between about 50 vol % and about 80 vol % of the polymeric material polymer-based matrix. For example, the polymer-based overlay layer may comprise between about 60 vol % and about 75 vol %, or between about 62 vol % and about 73 vol % of the polymeric material polymer-based matrix. In some embodiments, the polymeric material of the polymer-based matrix accounts for the balance in the composition of the polymer-based overlay layer. In some embodiments, the polymeric material of the polymer-based matrix accounts for the balance in the composition of the polymer-based overlay layer, aside from incidental impurities.

The pigment has the dual function of imparting a colour to the polymer-based overlay layer and improving the wear resistance of the polymer-based overlay layer. The provision of the pigment having a hardness of at least 4 on the Mohs hardness scale may therefore advantageously reduce or remove the need for the polymer-based overlay layer to include additional hard particles to improve the wear resistance of the polymer-based overlay layer. The polymer-based overlay layer may nevertheless comprise hard particles dispersed throughout the polymer-based matrix, in addition to the pigment. Suitable hard particles include: nitrides; carbides; borides; and oxides. Other suitable materials are envisaged and will be readily apparent to the skilled person. The provision of hard particles may improve the wear resistance properties of the polymer-based overlay layer.

The provision of a metal particulate may advantageously enhance at least one of the conformability, thermal conductivity, fatigue strength, and seizure resistance properties of the polymer-based overlay layer. The metal particulate may comprise at least one of aluminium, aluminium alloys, copper, copper alloys, silver, tungsten, stainless steel. Preferably, the metal particulate comprises aluminium.

The metal particulate may be any metal particulate but preferably comprises metal flakes. The flake-like nature of the particulate generally results in the maximum area of metal particulate being exposed to a co-operating shaft journal by virtue of the plane of the flakes orientating generally parallel to the bearing surface. The provision of flakes within the polymer-based overlay layer that are generally parallel to the bearing surface may be provided by spray deposition of the polymer-based overlay layer.

A further advantage of the platelet flake morphology of the metal particulate is that the flakes are more securely bonded to the polymer-based matrix by virtue of the relatively large surface area of each individual flake, and thus resists metal flakes becoming plucked from the polymer-based matrix during engine operation.

Preferably, the metal particulate comprises aluminium flakes. Without wishing to be bound by any particular theory, it is believed that the superior wear resistance of the bearing material comprising aluminium flakes may be due to an alumina film which forms on the surface of the aluminium flakes. It is believed that the alumina provides a very fine abrasive which tends to polish the machining asperities on the co-operating shaft journal surface rendering the shaft journal surface itself less abrasive to the polymer based bearing material and thus reducing the wear rate thereof.

The polymer-based overlay layer may comprise between about 2 vol % and about 25 vol % of the metal particulate. For example, the polymer-based overlay layer may comprise between about 6 vol % and about 20 vol %, between about 10 vol % and about 20 vol % of the metal particulate, or between about 12 vol % and about 16 vol % of the metal particulate. Below about 2 vol % of the metal particulate, the improvement in fatigue and seizure resistance may not be significant. Above about 25 vol % of the metal particulate, the structural integrity of the polymer-based overlay layer may be compromised.

The polymer-based overlay layer may be deposited as a mixture of a plastic polymer-based matrix material and suspended material, and may further comprise solvent, which may facilitate forming the mixture. Suitable solvents may be non-polar (e.g. xylene, toluene), polar aprotic (e.g. acetone, n-ethyl-2-pyrrolidone {NEP}, n-methyl-2-pyrrolidone gamma-butyrolactone, dipropylene glycol dimethyl ether) or polar protic (e.g. water, alcohol, glycol). The solvent can be employed in various proportions in order to achieve a particular desired viscosity of mixture for applying onto the substrate.

The metal particulate may have a D50 size of between about 0.1 μm and about 40 μm along the maximal dimension. For example, the metal particulate may have a D50 size of between about 5 μm and about 30 μm along a maximal dimension, or between about 7 μm and about 13 μm along a maximal dimension. This has been found to provide a particularly suitable form of metal particulate addition. D50 is the median diameter of the particle size distribution of the metal particulate.

The polymer-based overlay layer may comprise an adhesion promoter. Adhesion promoters have been found to promote stability of the polyamide/imide matrix and have also been found to promote adhesion of the polyamide/imide resin material to the substrate. One example adhesion promoter may comprise a silane material. A suitable silane material may be gamma-aminopropyltriethoxysilane (e.g. 3-aminopropyltriethoxysilane). Another example adhesion promotor may comprise a material other than a silane material. For example, the adhesion promoter may comprise bis-(gamma-trimethoxysilpropyl)amine.

The polymer-based overlay layer may comprise between about 1 vol % and about 10 vol % of adhesion promoter. For example, the polymer-based overlay layer may comprise between about 3 vol % and about 6 vol % of adhesion promoter.

The polymer-based overlay layer may further comprise a dry lubricant. The dry lubricant may be a dry lubricant particulate. The dry lubricant particulate may be included in the overlay layer for its beneficial effect on material frictional properties and its self-lubricating effect. Suitable dry lubricant particulates include fluoropolymer, molybdenum disulfide ($MoS_2$), tungsten disulphide ($WS_2$), hexagonal boron nitride (h-BN), metal sulphides with layered structures, and graphite, or a combination of any of these materials. The fluoropolymer particulate addition may preferably be constituted by polytetrafluoroethylene (PTFE), as this is the most effective of the fluoropolymers in terms of reducing the friction coefficient and improving the self-lubricating properties of the polymer-based overlay layer. However, other suitable fluoropolymers, such as fluorinated ethylene-propylene (FEP), may be used if desired. Other suitable materials are envisaged and will be readily apparent to the skilled person.

The polymer-based overlay layer may comprise between about 1 vol % and about 20 vol % of dry lubricant. For example, the polymer-based overlay layer may comprise between about 3 vol % and about 12 vol %, or about 6 vol % and about 8 vol % of dry lubricant. In some particularly preferred embodiments, the polymer-based overlay layer may comprise between about 6 vol % and about 8 vol % of PTFE particulate as dry lubricant.

The polymer-based overlay layer may further comprise a leveller. The leveller may improve the wetting of the polymer-based matrix on the metal substrate when the polymer-based matrix is applied to the substrate. Improved wetting advantageously results in a polymer-based overlay layer having a more even thickness.

As used herein, quantities of components described in volume percentages (vol %) refer to the volume percent, or vol %, of the components in the final cured coating, i.e. when any solvent has been removed and the polymer-based matrix has cured.

The pigment has a hardness of at least 4 on the Mohs hardness scale. For example, the pigment may have a hardness of at least about 5, at least about 6, at least about 7, or at least about 8 on the Mohs hardness scale.

The Mohs hardness scale is a scale for classifying the hardness of materials based on their ability to scratch materials rated lower on the scale. The Mohs hardness scale rates materials on a scale of 1 to 10, 10 being the hardest.

The pigment may have a hardness of no more than about 9 on the Mohs hardness scale. For example, the pigment may have a hardness of no more than about 8, no more than about 7, no more than about 6, or no more than about 5 on the Mohs hardness scale.

The pigment may have a hardness of between about 4 on the Mohs hardness scale and about 9 on the Mohs hardness scale. For example, the pigment may have a hardness of: between about 5 on the Mohs hardness scale and about 9 on the Mohs hardness scale. between about 6 on the Mohs hardness scale and about 9 on the Mohs hardness scale, between about 7 on the Mohs hardness scale and about 9 on the Mohs hardness scale, or between about 8 on the Mohs hardness scale and about 9 on the Mohs hardness scale.

The pigment may be of a different colour to a colour of the surface of the metallic substrate onto which the polymer-based layer is provided.

The provision of a pigment which provides the polymer-based overlay layer with a colour enables enhanced reliability during manufacturing, by facilitating a visual distinction between sliding engine components that have and have not been provided with the polymer-based overlay layer, and to distinguish between sliding engine components having different coatings. This facilitates distinguishing between sliding engine components of different colours in an automated quality control process. This can help prevent misassembly during manufacture. The colours caused by the pigment may be identifiable by machines such as assembly robots and may therefore assist with automated manufacture of automotive components Preferably a colour of the overlay layer is visually discernible from a colour of the metallic substrate.

This is advantageous where the polymer-based overlay layer might otherwise match or be similar to the colour of the metallic substrate (e.g. an otherwise silver-coloured layer on a silver-coloured substrate). Furthermore, since a colour of the polymer-based overlay layer is visually discernible from a colour of the metallic substrate, a user is able to identify sliding elements embodying the present invention by simple visual inspection. This may also help a user to visually distinguish between several components which have been provided with different coatings, one of which is the polymer-based overlay layer of preferred embodiments of the present invention. This may advantageously help prevent misassembly during manufacture.

The pigment may be of a different colour to the colour of the metal particulate. This may advantageously improve the ability of the pigment to impart a colour to the polymer-based overlay layer comprising the metal particulate.

The pigment may cause the polymer-based overlay layer to appear a colour other than silver, or grey.

The pigment may be any suitable pigment. The pigment may be an inorganic pigment.

The pigment may comprise a metal oxide. For example, the pigment may comprise an oxide of at least one of: titanium, chromium, zinc, nickel, cobalt, copper, iron, vanadium, aluminium, cadmium, bismuth, and manganese.

The pigment may comprise at least one of a titanium oxide, and a chromium oxide. The pigment may comprise at least one of titanium dioxide ($TiO_2$), and chromium (III) oxide ($Cr_2O_3$). Titanium dioxide pigment has a hardness of about 6.5 on the Mohs hardness scale. Titanium dioxide pigment imparts a white colour to the polymer-based overlay layer. Chromium (III) oxide pigment has a hardness of between about 8 and about 8.5 on the Mohs hardness scale. Chromium (III) oxide pigment imparts a green colour to the polymer-based overlay layer. It has been found that the use of chromium (III) oxide pigment is particularly effective in imparting a colour to polymer-based overlay layers comprising metal particulate.

The pigment may comprise a complex inorganic colour pigment (CICP).

As used herein in relation to preferred embodiments of the present invention, the terms "complex inorganic colour pigment" and "mixed metal oxide" describe a crystalline metal oxide comprising at least two different metal ions. Furthermore, as used herein in relation to preferred embodiments of the present invention, the term "complex inorganic colour pigment" specifically refers to a crystalline metal oxide comprising at least two different metal ions and which can act as a pigment. In addition to the metal oxide, complex inorganic colour pigments may comprise additional components such as salts. The combination of different metal ions leads to the distinctive colour of each complex inorganic colour pigment. Complex inorganic colour pigments may be doped with further substances, such as additional metals, to alter the colour of the complex inorganic colour pigment. Complex inorganic colour pigments may also be referred to as "calcined pigments" as they are typically formed by a calcination reaction at a high temperature which determines their specific crystal structure. The complex inorganic colour pigment may have a rutile structure, a hematite structure, a corundum structure, or a spinel structure.

The pigment may comprise at least one of chrome antimony titanium buff (($Ti,Cr,Sb)O_2$), and cobalt chromite green spinel ($Co(Al,Cr)_2O_4$). Chrome antimony titanium buff, and cobalt chromite green spinel are examples of complex inorganic colour pigments.

The pigment may comprise chrome antimony titanium buff. Chrome antimony titanium buff pigment has a hardness of between about 6 and about 7 on the Mohs hardness scale. Chrome antimony titanium buff pigment imparts a yellow colour to the polymer-based overlay layer.

The pigment may comprise cobalt chromite green spinel. Cobalt chromite green spinel pigment has a hardness of between about 7 and about 8 on the Mohs hardness scale. Cobalt chromite green spinel pigment imparts a blue or turquoise colour to the polymer-based overlay layer.

The pigment may comprise particles of any size. The pigment may comprise particles having a D50 size of at least about 0.1 μm. For example, the pigment may comprise particles having a D50 size of at least about 0.2 μm, at least about 0.3 μm, or at least about 0.4 μm. The pigment may comprise particles having a D50 size of no more than about 2 μm. For example, the pigment may comprise particles having a D50 size of no more than about 1.5 μm, no more than about 1 μm, no more than about 0.9 μm or no more than about 0.6 μm.

For example, the pigment may comprise particles having a D50 size of between about 0.1 μm and about 2 μm, between about 0.2 μm and about 1 μm, between about 0.3 μm and about 0.9 μm, or between about 0.4 μm and about 0.6 μm. Preferably, the pigment comprises particles having a D50 size of between about 0.1 μm and about 0.6 μm.

The provision of pigment comprising particles having a D50 size of less than about 1 μm may advantageously improve the fatigue strength of the polymer-based overlay layer. The provision of pigment comprising particles having a D50 size of greater than about 0.2 μm may help improve the wear properties of the polymer-based overlay layer and may advantageously prevent agglomeration of the particles of the pigment which may help ensure an even dispersion of the pigment throughout the polymer-based matrix. This may advantageously help to provide an even colour to the polymer-based overlay layer. A reduction in the agglomeration of the particles of the pigment may also advantageously improve the fatigue strength of the polymer-based overlay layer.

The polymer-based overlay layer may comprise at least 0.5 vol % of the pigment. For example, the polymer-based overlay layer may comprise at least about 5 vol % of the pigment, about 8 vol % of the pigment, or about 10 vol % of the pigment.

It has been found that polymer-based overlay layers of the invention with less than about 0.5 vol % of the pigment may not exhibit a significant colour change compared to the same polymer-based overlay layer without any pigment. Nevertheless, polymer-based overlay layers of the invention with less than about 0.5 vol % of the pigment may still exhibit improved wear properties compared to same polymer-based overlay layer without any pigment.

The polymer-based overlay layer may comprise no more than 25 vol % of the pigment. For example, the polymer-based overlay layer may comprise no more than about 20 vol % of the pigment, about 15 vol % of the pigment, or about 12 vol % of the pigment.

It has been found that polymer-based overlay layers of the invention with more than about 25 vol % of the pigment may adversely affect other mechanical properties of the polymer-based overlay layer. Additionally, adding more than about 25 vol % of the pigment may lead to damage to the polymer-based overlay layer or the metallic substrate. For example, polymer-based overlay layers of the invention with more than about 25 vol % of the pigment may exhibit inferior fatigue strength compared same polymer-based overlay layer without any pigment.

The polymer-based overlay layer may comprise between about 0.5 vol % and about 25 vol % of the pigment. For example, the polymer-based overlay layer may comprise between about 5 vol % and about 20 vol % of the pigment, between about 8 vol % and about 15 vol % of the pigment, or between about 10 vol % and about 12 vol % of the pigment. The polymer-based overlay layer may comprise between about 0.5 vol % and about 12 vol % of the pigment. The polymer-based overlay layer may comprise about 12 vol % of the pigment.

Where the pigment is added in quantities at the higher end of the volume percentage range specified above, for example between about 12 and about 25 vol %, the advantageous effects associated with the inclusion of the pigment, for example improved wear resistance, may be realised where the pigment has a hardness towards the lower end of the hardness range specified above, for example between about 4 and about 7 on the Mohs hardness scale.

Where the pigment has a hardness towards the higher end of the hardness range specified above, for example between about 7 and about 9 on the Mohs hardness scale, the advantageous effects associated with the inclusion of the pigment, for example improved wear resistance, may be realised where the pigment is added in quantities at the lower end of the volume percentage range specified above, for example between about 0.5 and about 12 vol %.

The polymer-based overlay layer may have a thickness of between about 3 µm and about 17 µm. For example, the polymer-based overlay layer may have a thickness of between about 6 µm and about 12 µm. The polymer-based overlay layer may have a thickness of about 10 µm.

According to a second aspect of the present invention, there is provided an engine comprising a sliding element according to the first aspect of the present invention.

According to a third aspect of the present invention, there is provided a vehicle comprising a sliding element according to the first aspect of the present invention According to a fourth aspect of the present invention, there is provided a method of producing a sliding element for an engine, the method comprising steps of: combining a polymer-based matrix; a metal particulate; and a pigment to form a mixture, the pigment having a hardness of at least 4 on the Mohs hardness scale; and applying the mixture to a metallic substrate.

The polymer-based matrix, metal particulate, and pigment may be combined with at least one additional component to for the mixture. The at least one additional component may comprise; a solvent, an adhesion promoter, additional hard particles, or dry lubricant.

The polymer-based matrix may be applied to the metallic substrate, or an intermediate layer where present, by a number of different methods. Suitable methods include spraying, pad printing (an indirect offset printing process, e.g. in which a silicone pad transfers a patterned layer of the plastic polymer composite material onto the sliding bearing substrate), screen printing, or by a transfer rolling process. The application step may comprise the deposition of several sub-layers to build up the overall polymer-based overlay layer. The method may further comprise a flash-off phase between each sub-layer deposition to remove the solvent. Each sub-layer may comprise the same composition of polymer-based matrix. Alternatively, each sub-layer may comprise different compositions of the polymer-based matrix.

The method may further comprise a curing step. The curing step may take place at about 140° C. to 300° C. The thermal curing may be provided by baking in an oven or irradiating the sliding engine element with infrared radiation. Alternatively, the polymer-based overlay layer may be cured by a non-thermal process, for example being cured by exposure to ultraviolet light. The curing step may take between about 2 minutes and about 2.5 hours. For example, the curing step may take about 2 hours.

The metal particulate may comprise aluminium flakes.

It should be appreciated that any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including the accompanying claims, abstract and drawing), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

BRIEF DESCRIPTION OF THE DRAWINGS

One or more preferred embodiments of the present invention will further be described by way of example only with reference to the accompanying drawing, in which:—

The FIGURE shows a perspective view of a sliding element according to preferred embodiments of the present invention. The FIGURE provided herein is schematic and not to scale.

DETAILED DESCRIPTION

The FIGURE schematically illustrates a sliding bearing 100 (e.g. a sliding engine component) in the form of a hollow semi-cylindrical bearing lining shell (commonly referred to as a "half bearing"). Many alternative shapes and configurations of the bearing element are envisaged and will be readily apparent to the skilled person. The sliding bearing 100 has a metallic substrate 102 formed from steel. The sliding bearing 100 further comprises an optional bearing lining layer 104 on the concave inner surface of the metallic substrate 102. The bearing lining layer 104 comprises an aluminium-tin alloy. A polymer-based overlay layer 106 is provided on the substrate 102. The overlay layer 106 is configured to provide a running surface over the lifetime of the sliding bearing 100. The overlay layer 106 is the innermost layer of the half bearing, which is configured to face a cooperating moving part (not shown) in a bearing assembly (e.g. the overlay layer receives a journaled shaft in an assembled bearing, which mutually cooperate, with an intervening film of lubricating oil).

The overlay layer 106 comprises a polymer-based matrix formed from polyamide imide (PAI). The overlay layer 106 further comprises aluminium flakes. The aluminium flakes have a D50 size of between about 10 μm and about 20 μm along the maximal dimension. The overlay layer 106 comprises 10-16 vol % of the aluminium flakes dispersed evenly throughout the polymer-based matrix. The overlay layer further comprises 0.5-12 vol % pigment. The pigment comprises chromium oxide particulate having a D50 size between about 0.5 μm and about 0.7 μm and a hardness of between about 7 and 8.5 on the Mohs hardness scale. The overlay layer 106 further comprises 6-8 vol % polytetrafluoroethylene (PTFE) to act as a dry lubricant. The dry lubricant has a D50 particle size of about 3 μm. The overlay layer 106 further comprises 3-6 vol % silane as an adhesion promoting agent.

The overlay layer 106 has a thickness of about 10 μm and appears green in colour due to the chromium oxide pigment.

To form the sliding bearing 100 having a polymer-based overlay layer 106, the polymer (PAI) is added to a premixed solvent blend to form a solution. The dry lubricant, pigment, silane and aluminium flakes are added to form a mixture.

The mixture is then applied to the metallic substrate 102 which may already have a bearing lining layer 104 on its inner surface. The polymer-based matrix solution is applied by spraying to form a series of sub-layers. After the deposition of each sub-layer, the solvent is removed by a flash-off phase. After deposition, the polymer-based matrix solution is cured by heating the sliding bearing 100.

Although illustrated in the FIGURE in relation to a half bearing shell, the present invention equally applies to other sliding engine components, including semi-annular, annular or circular thrust washers, and bushes. The mechanical performance enhancing additives (e.g. dry lubricant particulate, silane, pigment, and metal particulate) dispersed within the polymer-based matrix provide significant enhancements to the mechanical performance of the sliding engine component, such as wear resistance, adhesion promotion, fatigue resistance, and frictional properties.

The invention claimed is:

1. A sliding element for an engine, comprising:
a polymer-based overlay layer;
a metallic substrate;
wherein the polymer-based overlay layer includes:
a polymer-based matrix;
a metal particulate; and
a pigment having a hardness of at least 4 on the Mohs hardness scale;
wherein the pigment includes a complex inorganic colour pigment; and
wherein the complex inorganic colour pigment includes cobalt chromite green spinel.

2. The sliding element according to claim 1, wherein the metal particulate includes a plurality of aluminium flakes.

3. The sliding element according to claim 1, wherein the polymer-based overlay layer includes about 10 vol % to about 20 vol % of the metal particulate.

4. The sliding element according to claim 1, wherein the pigment is of a different colour relative to a colour of a surface of the metallic substrate on which the polymer-based layer is disposed.

5. The sliding element according to claim 1, wherein the pigment includes a metal oxide.

6. The sliding element according to claim 5, wherein the pigment includes a titanium oxide.

7. The sliding element according to claim 5, wherein:
the pigment includes a chromium oxide;
the chromium oxide has a D50 size of about 0.5 μm to about 0.7 μm; and
the chromium oxide a hardness of 7 to 8.5 on the Mohs hardness scale.

8. The sliding element according to claim 1, wherein the pigment includes chrome antimony titanium buff.

9. The sliding element according to claim 1, wherein the pigment includes a plurality of particles having a D50 size of about 0.1 μm to about 2 μm.

10. The sliding element according to claim 1, wherein the polymer-based overlay layer includes at least 0.5 vol % of the pigment.

11. The sliding element according to claim 1, wherein the polymer-based overlay layer includes 25 vol % or less of the pigment.

12. An engine, comprising the sliding element according to claim 1.

13. A vehicle, comprising the sliding element according to claim 1.

14. The sliding element according to claim 1, wherein:
the polymer-based overlay layer further includes about 6 vol % to 8 vol % of a dry lubricant; and
the dry lubricant includes polytetrafluoroethylene (PTFE).

15. The sliding element according to claim 1, wherein:
the polymer-based overlay layer further includes about 3 vol % to 6 vol % of an adhesion promoting agent; and
the adhesion promoting agent includes silane.

16. The sliding element according to claim 1, wherein the polymer-based overlay layer includes about 60 vol % to about 75 vol % of the polymer-based matrix.

17. A method of producing a sliding element for an engine, the method comprising:
combining a polymer-based matrix, a metal particulate, and a pigment to form a mixture, the pigment having a hardness of 7 to 9 on the Mohs hardness scale;
forming a polymer-based overlay layer via applying the mixture to a metallic substrate; and
wherein the polymer-based overlay layer includes about 0.5 vol % to 12 vol % of pigment.

18. The method according to claim 17, wherein the pigment includes a complex inorganic colour pigment having one of:
a rutile structure;
a hematite structure;
a corundum structure; and
a spinel structure.

19. The method according to claim 17, wherein the pigment includes a complex inorganic colour pigment comprising a salt.

20. A sliding element for an engine, comprising:
a polymer-based overlay layer;
a metallic substrate;
wherein the polymer-based overlay layer includes:
a polymer-based matrix;
a metal particulate; and
a pigment having a hardness of at least 4 on the Mohs hardness scale;
wherein the pigment includes a metal oxide;
wherein the pigment includes a chromium oxide having:
a D50 size of about 0.5 µm to about 0.7 µm; and
a hardness of 7 to 8.5 on the Mohs hardness scale.

\* \* \* \* \*